Patented Apr. 24, 1951

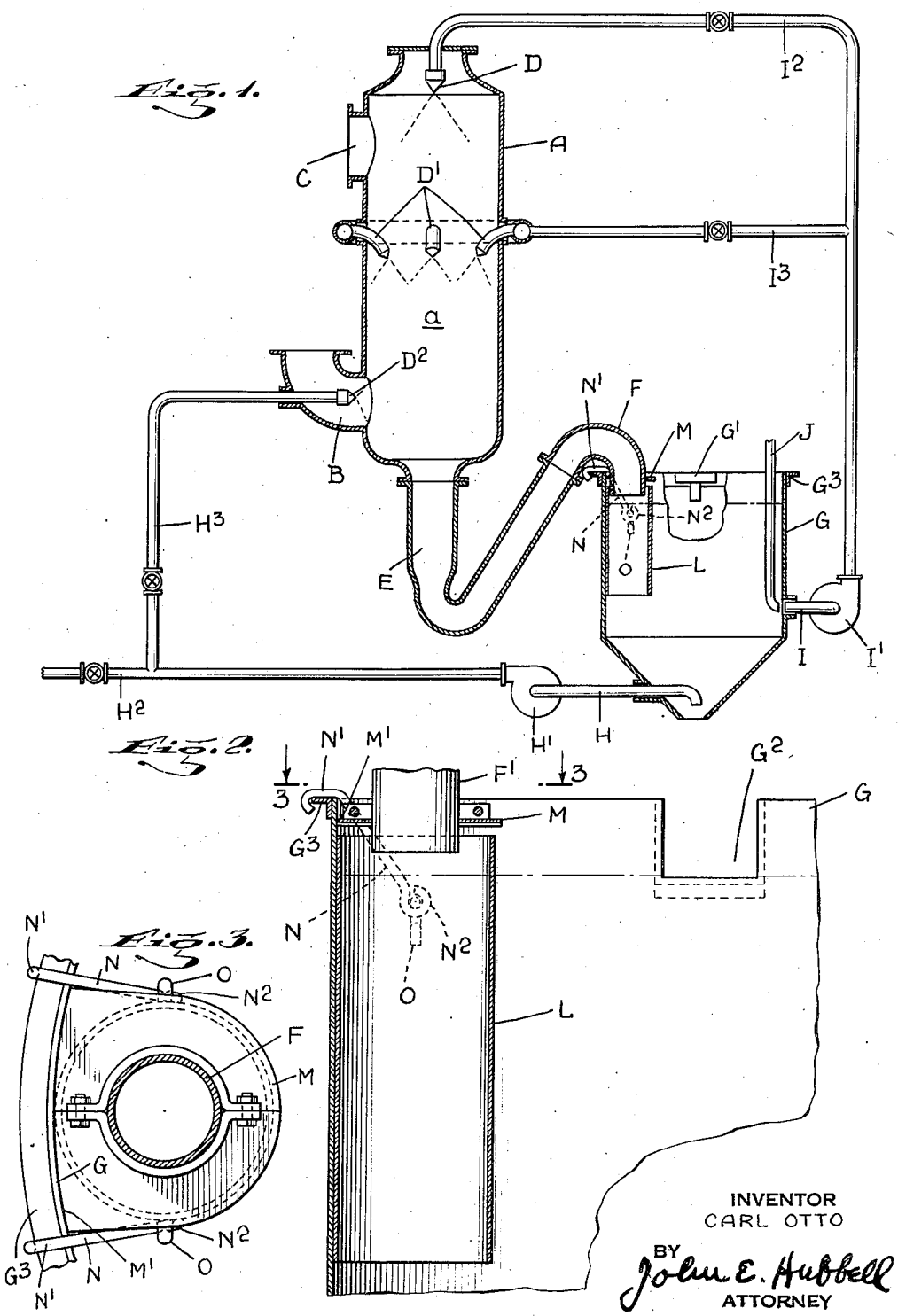

2,549,848

UNITED STATES PATENT OFFICE 2,549,848

SPRAY SATURATOR CRYSTALLIZER

Carl Otto, Manhasset, N. Y.

Application November 9, 1949, Serial No. 126,339

4 Claims. (Cl. 23—273)

The present invention relates to apparatus for the production of sulphate of ammonia by scrubbing coke oven gas with liquor containing ammonium sulphate and sulphuric acid, and particularly to apparatus of the type disclosed and claimed in my prior application, Serial No. 14,902, filed March 15, 1948. In the apparatus disclosed in said prior application, coke oven gas is passed continuously through a scrubbing chamber into which liquor is sprayed and from which the liquor falling to the bottom of the scrubbing chamber drains into a crystallizing tank. The liquor sprayed into the scrubbing chamber ordinarily consists of a saturated solution of ammonia sulphate and entrained ammonium sulphate crystals, and 9 per cent or so of sulphuric acid. In the scrubbing chamber, the ammonia absorbed from the gas ordinarily combines with 45 per cent or so of the sulphuric acid and in the liquor and supersaturates the latter, and also causes the entrained crystals to grow. In the crystallizer, the supersaturated liquor transfers a portion of its ammonium sulphate content to the crystals in contact with the liquor and thus effects the desupersaturation of the liquor, and a desirable further crystal growth. Slurry containing crystals of relatively large average size is withdrawn from the crystallizer and passed to crystal drying apparatus, and desupersaturated liquor with entrained crystals is passed from the crystallizer back to the apparatus for spraying liquor into the scrubbing chamber. Make up acid is mixed with the liquor returned to a portion, at least, of the spraying apparatus.

In the apparatus disclosed in said prior application, and of a form now in commercial use, the liquor passes from the scrubbing space to the crystallizer through a discharge pipe of V shape maintaining a liquid seal between the scrubbing space and the discharge end of the pipe, which opens into the atmosphere at a level which is a few inches, at least, above the over flow level of the crystallizer, but is low enough to prevent liquor from accumulating in the scrubbing space $a$ in normal operation. The elevation of the discharge end of said liquor discharge pipe above the liquor body in the crystallizer avoids syphoning action and causes the liquor passing downward from the pipe into the liquor body to agitate the latter and thus desirably expedites and augments the growth of crystals, and expedites the desupersaturation of liquor in the crystallizer.

In the use of the apparatus disclosed in said prior application, the splashing action of the liquor passing from the discharge pipe into contact with the liquor body in the crystallizer has caused objectionable liquor wastage and spillage. The primary object of the present invention is to provide simple and effective means for passing the liquor draining out of the scrubbing chamber into the crystallizer tank in such manner as to substantially eliminate the objectionable liquor wastage and spillage heretofore experienced, without sacrifice of the advantages obtained when the liquor passing away from the scrubbing space plunges through an air space before coming into contact with the liquor in the crystallizer.

The various features of novelty which characterize my invention are pointed out with particularity in the claims annexed to and forming a part of this specification. For a better understanding of the invention, however, its advantages, and specific objects attained with its use, reference should be had to the accompanying drawing and descriptive matter in which I have illustrated and described preferred embodiment of the invention.

Of the drawings:

Fig. 1 is a diagrammatic elevation of apparatus comprising a scrubbing chamber and a crystallizing tank associated in accordance with the present invention;

Fig. 2 is a sectional elevation on a larger scale through a portion of the crystallizer and associated goose neck; and Fig. 3 is a section on line 3—3 of Fig. 2.

In Fig. 1, I have diagrammatically illustrated a preferred embodiment of the present invention in apparatus for the production of sulphate of ammonia which is of the general type disclosed in my said prior application. In Fig. 1, A represents a tank enclosing a scrubbing space or chamber $a$ into which coke oven gas containing a small amount of ammonia is passed through a gas inlet pipe B. The gas passed into the chamber $a$ through the pipe B, passes out of that chamber through a gas outlet C. Spray nozzles D, D' and D² spray liquor into the space A at upper, intermediate and lower levels. The liquor sprayed into and falling down to the chamber A passes away from the latter through a liquid discharge pipe E. The latter comprises a section extending downwardly beneath the tank A and having its upper end in communication with the lower end of the space $a$, and comprises a second upwardly inclined pipe section shown as integrally connected at its lower end to the lower end of the first mentioned section and having an upper reversely curved discharge end section F which may be appropriately designated a goose neck pipe section F. The spray liquor falling to the bottom of the chamber $a$ drains out of the latter through the discharge pipe E. The lower end portions of the first and second sections of the pipe provide a liquor seal between the scrubbing space $a$ and the atmosphere into which the down turned end of the goose neck section F opens.

The downwardly directed stream of liquor discharged by the goose neck F passes into a crystallizer tank G, which also serves as an overflow tank or pot. The tank G is open at its upper end and is provided at one side with tar eliminating means G′, which may be of customary type, and is provided at its opposite side with an overflow connection $G^2$ of conventional form for discharging into the customary mother liquor tank (not illustrated), when the liquor in the tank G rises to the over flow level. As diagrammatically shown, the tank G is provided with an outlet H extending through the conical wall surrounding the conical or hopper bottom portion of the tank structure for the removal of slurry containing the crystals of relatively large average size which accumulate in the bottom portion of the tank G. The slurry is drawn out of the tank G by a pump H′ which has one valved discharge branch $H^2$ delivering liquor and entrained crystals to the spray nozzle $D^2$, and another valved discharge branch $H^2$ through which the slurry is passed to crystal separating and drying apparatus which may be of the usual type and is not shown herein. A second pipe I shown as opening to the crystallizer tank G at a level above its conical bottom portion, serves as a conduit through which a pump I draws liquor with entrained crystals from the tank G, and passes the liquor and crystals so withdrawn to the upper and intermediate spray nozzles D and D′ through valved discharge pipe branches $I^2$ and $I^3$, respectively. Make up acid is passed into the crystallizer tank G through a pipe J which has its discharge end directed toward and in close proximity to the inlet end of the liquor output pipe I. All or most of the make up acid supplied through the pipe J is immediately drawn into the pipe I, and is mixed with the liquor passing to the upper and intermediate level spray nozzles D and D′ respectively.

In accordance with the present invention, waste or spillage of the liquor discharged through pipe sections E and F is prevented by means of a tubular vertically disposed spout L, and baffle or splash plate M associated with the goose neck F. The spout L is mounted in the crystallizer tank G and forms a sort of depending telescopic extension of the discharge end of the goose neck F. As is clearly shown in Fig. 2, the internal diameter of the spout L is substantially greater than the external diameter of the discharged end portion F of the discharge pipe E. For example, in the particular embodiment of the invention illustrated, the diameter of the spout L is 18 inches, and the diameter of the discharge end of the goose neck F is 10 inches. The lower end of the discharge end portion of the goose neck is several inches above the maximum normal liquor level in the tank G, so that the space within the upper portion of the spout member L into which the goose neck discharges is air filled and in free communication with the atmosphere at all times. In consequence, the discharge pipe E with its goose neck discharge end portion F, can not act as a syphon and thus interrupt the liquor seal action of the outflow pipe E.

The baffle member M is shown as attached to the goose neck F at a level a few inches above the upper end of the spout L. The baffle M extends radially away from the vertical lower end of the goose neck F far enough to substantially prevent movement out of the tank G of splash liquor moving upward through the annular space surrounding the lower end of the goose neck and between the latter and the surrounding upper end portion of the tubular member L. As shown, the baffle M is in the form of a split collar or flange clamped on the lower end of the goose neck. The diameter of the flange or baffle M is preferably somewhat greater than the diameter of the tubular spout L.

The spout L is connected to and supported by the upper portion of the tank G. In the particular structural form illustrated, the spout is suspended from the reinforced rim $G^3$ of the tank G by a pair of hook members N. Each member N has a hook portion N′ at one end adapted to fit over the rim portion $G^3$, and each hook member N has an eye $N^2$ at its lower end which surrounds a staple or yoke shaped part O having its end portions welded to the outer side of the spout L. As shown, the two yoke or staple like portions O are attached to diametrically opposed portions of the wall of the spout member M. With the described arrangement, the side of the spout L is gravity held in engagement with the adjacent portion of the inner wall of the tank G.

In the normal use of the present invention, the liquor level in the spout L at its maximum height is appreciably below the level of the top of the spout L. In consequence, the only splash liquor which can pass into the air space above the spout L, is the small portion of the splash liquor which moves in a vertical or nearly vertical direction through the annular space between the lower portion of the goose neck F and the surrounding upper portion of the member L. In consequence, substantially all of the splash liquor moving upward through said annular space will be returned to the tank after impinging against the underside of the annular baffle or collar M when the peripheral portion of the latter overlaps the upper edge of the spout L. Advantageously all of the apparatus coming in contact with the acidified liquor is formed of material, such as Monel metal which is substantially immune to corrosive attacks by the diluted or weak sulphuric acid content of the liquor. Advantageously also, the goose neck section F of the discharge pipe is connected to the adjacent end of the body portion of the pipe by pipe joint connecting means of a form which may be of conventional, and permitting the ready disconnection and removal of the pipe section F when necessary, to permit inspection, cleaning or repairs of the tank G and associated apparatus therein.

As shown in Fig. 3, the baffle M is formed with an arc shaped edge M′ forming an elongated bearing surface engaging the inner side of the tank G and assists in anchoring the discharge pipe in place in the tank G.

While in accordance with the provisions of the statutes, I have illustrated and described the best form of embodiment of my invention now known to me, it will be apparent to those skilled in the art that changes may be made in the form of the apparatus disclosed without departing from the spirit of my invention as set forth in the appended claims, and that in some cases certain features of my invention may be used to advantage without a corresponding use of other features.

Having now described my invention, what I claim as new and desire to secure by Letters Patent, is:

1. In spray saturator apparatus comprising a scrubbing chamber having an inlet for the inflow of gas having a small ammonia content, a gas outlet, and a bottom outlet for liquor, means for spraying liquor containing ammonium sulphate and sulphuric acid into said chamber, a liquor discharge pipe connected to said liquor outlet end comprising a depending portion extending downward from said liquor outlet and an uprising portion connected at its lower end to the lower end of said depending portion and uniting with the latter to form a liquor seal, a liquor holding tank open at its upper end and receiving liquor discharged by said pipe having an over flow outlet establishing a normal liquor over flow level in the tank; the improvement comprising an open ended vertical spout mounted in said tank and extending between upper and lower levels respectively above and below said over flow level and having its upper end open to the atmosphere, and in which said discharge pipe comprises a depending discharge end portion extending downward into the upper end of said spout and smaller in diameter than the latter and terminating at a level higher than said over flow level.

2. An improvement as specified in claim 1, including a baffle secured to, and surrounding the depending discharge end of said discharge pipe at a level spaced upward away from the top of said spout and extending across the annular space between said spout and the discharge end of the discharge pipe.

3. An improvement as specified in claim 2, in which said baffle has a portion of its edge nearest to the tank wall in the form of a circular arc having substantially the same radius of curvature as the inner wall of the tank, and in engagement with the latter.

4. An improvement as specified in claim 1, including means for detachably securing said vertical spout in said tank comprising a pair of hook arms at opposite sides of said spout and each having one end pivotally connected to said spout and having its other end in the form of a hook which extends over and engages the rim portion of the tank.

CARL OTTO.

No references cited.